Dec. 4, 1962 — R. H. RASMUSSEN — 3,066,432
MOBILE DISPLAY DEVICE
Filed Dec. 14, 1959 — 2 Sheets-Sheet 1
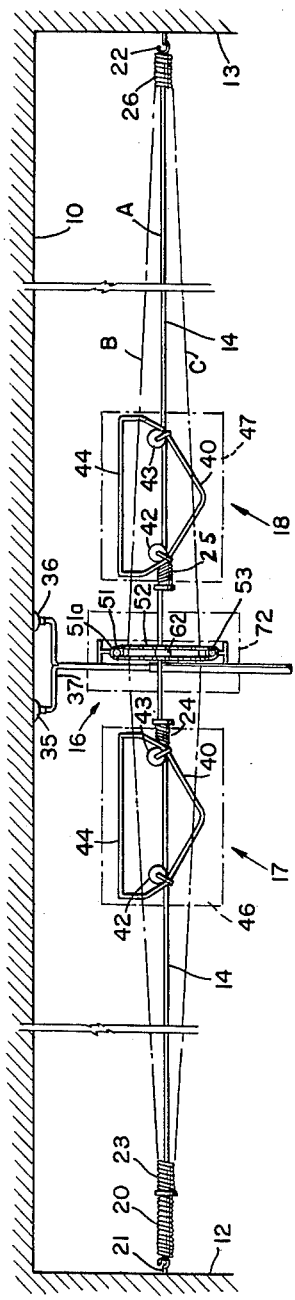
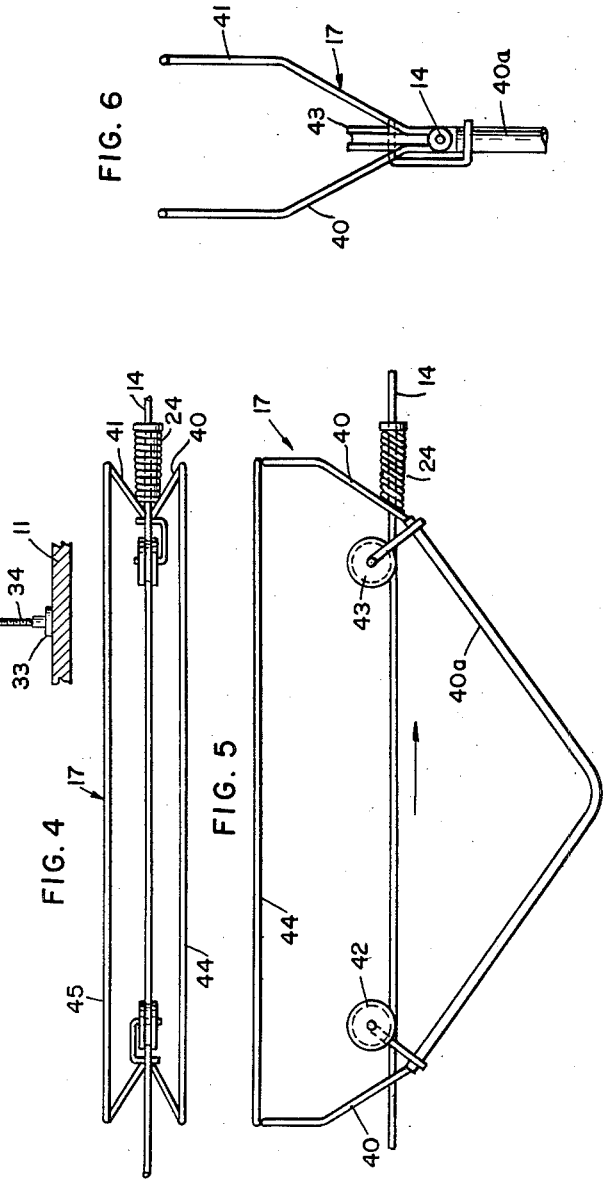
INVENTOR
ROBERT H. RASMUSSEN
BY
ATTORNEY

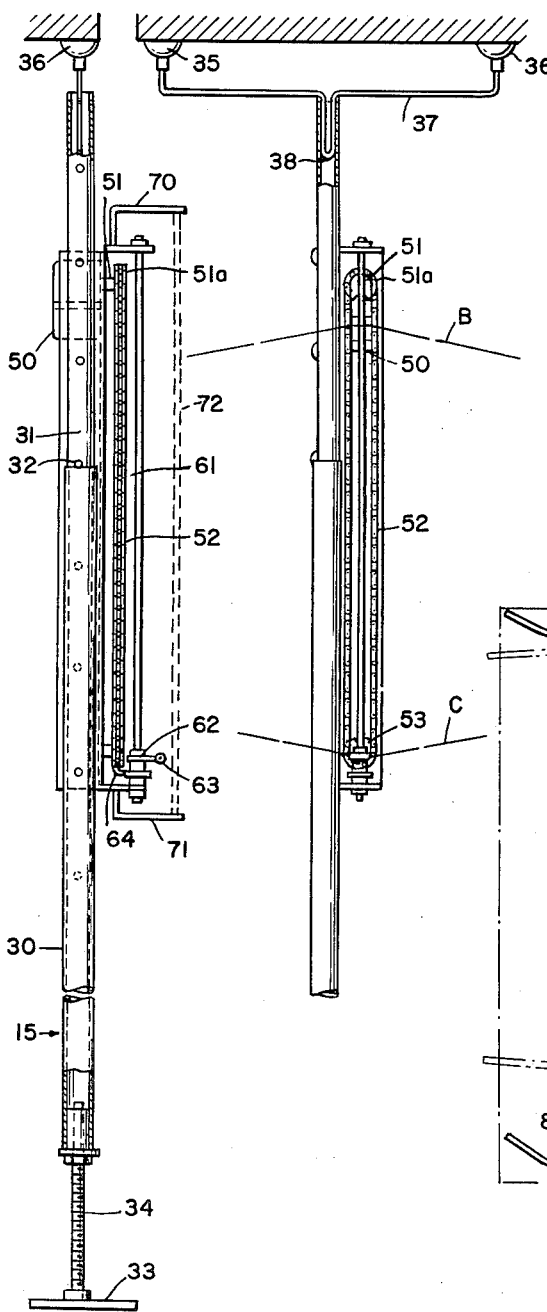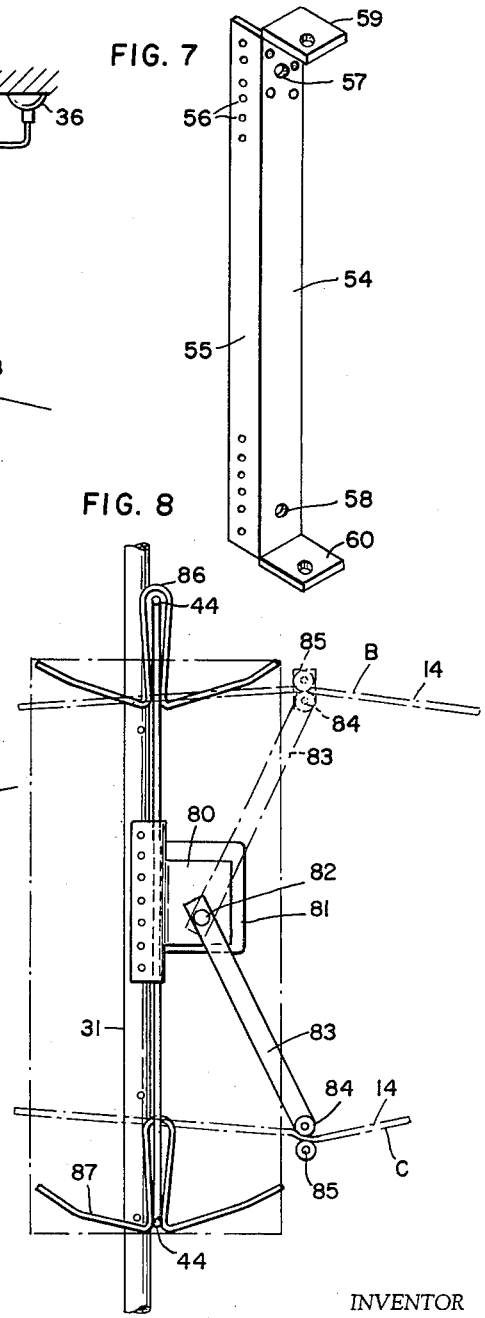

United States Patent Office 3,066,432
Patented Dec. 4, 1962

3,066,432
MOBILE DISPLAY DEVICE
Robert H. Rasmussen, 4231 Blanchan, Brookfield, Ill.
Filed Dec. 14, 1959, Ser. No. 859,322
8 Claims. (Cl. 40—106.31)

This invention relates to an indoor or outdoor advertising display device, and more particularly to such a device having reciprocable advertising display trolleys movable in a path toward and away from a central display.

An object of this invention is to provide a new and improved mobile advertising display.

Another object of the invention is to provide an advertising display having a wire or the like mounted between a pair of supports spaced a substantial distance apart with an intermediate unit between the wire ends, and a pair of trolleys one at each side of the intermediate unit movably mounted on the wire, whereby deflection of the wire to positions at either side of a mid-line results in inclination of the wire in opposite directions to cause the trolleys to alternately travel in opposite directions between a support and the intermediate unit.

Another object of the invention is to provide an advertising display device comprising an elongated member extendable between spaced supports, means intermediate the ends of the member for deflecting the member centrally thereof alternately to positions either side of a central undeflected position to slope the member in alternate directions, a pair of display trolleys mounted on said member one at each side of said means for free movement to travel in a direction induced by the slope of the member, and a support for said means.

Another object of the invention is to provide an invention as defined in the preceding paragraph in which said means for deflecting the elongated member comprises an element engaging said member intermediate the ends thereof and movable in a path to deflect the member alternately to opposite sides of the central position.

Further objects and advantages will become apparent from the following detailed description taken in connection with the accompanying drawings in which:

FIG. 1 is a vertical elevational view of a preferred embodiment of the advertising display device with parts broken away;

FIG. 2 is an enlarged elevational view with parts broken away of the center post and wire deflecting structure supported thereby and taken from the left of FIG. 1;

FIG. 3 is a fragmentary elevational view of the structure shown in FIG. 2 and taken from the right of FIG. 2;

FIG. 4 is a detailed plan view of a trolley in association with the supporting wire;

FIG. 5 is an elevational view of the trolley shown in FIG. 4;

FIG. 6 is an end view of the trolley shown in FIG. 4;

FIG. 7 is a detailed perspective view of a bracket mountable on the center support post; and FIG. 8 is a fragmentary elevational view of an alternate mechanism for deflecting the trolley supporting wire.

While this invention is susceptible of embodiments in many different forms, there is shown in the drawings and will herein be described in detail an embodiment of the invention together with a modification thereof, with the understanding that the present disclosure is to be considered as an exemplification of the principles of the invention and is not intended to limit the invention to the embodiment illustrated. The scope of the invention will be pointed out in the appended claims.

As shown in FIG. 1, the advertising display device is shown mounted within a room in association with a ceiling 10, a floor 11 and side walls 12 and 13. The display device is suitable for mounting in a supermarket or other store, although the display device is also suitable for use outdoors so long as the necessary supports are provided comparable to the structure shown in FIG. 1. In a store the device is mounted near the ceiling or at a height to clear counters and the heads of people.

The primary parts of the display device consist of an elongated member, indicated generally at 14, such as a wire, which extends between the walls 12 and 13, a central post, indicated generally at 15, which supports a wire deflecting mechanism, indicated generally at 16. A pair of trolleys, indicated generally at 17 and 18, are mounted on the wire 14 for travel along the length thereof between the central post 15 and a wall.

As shown in FIG. 1, the wire 14 has a central undeflected position shown in full line and indicated at A, and has two maximum positions of deflection shown in broken line and indicated at B and C. The maximum positions B and C of deflection are equally spaced from and at opposite sides of the central nondeflected position A. The wire 14 is maintained substantially taut and under tension by connection at one end to a spring 20 which is connected to the wall 12, as indicated at 21, and the opposite end of the wire 14 is connected to the wall 13 by a hook 22. The wire 14 carries suitable stops for resiliently stopping the trolley members 17 and 18 in their back and forth movements, and these stops consist of spring members 23, 24, 25 and 26 mounted on the wire and engageable by the trolleys. The trolleys 17 and 18 are shown in engagement with the spring stops 24 and 25 in FIG. 1.

The central supporting post 15 is formed of a pair of telescoping members as shown in FIGS. 2 and 3, with the outer member 30 slidably receiving the inner member 31 and the position therebetween being fixed by a member 32 positioned in an opening in the inner member 31. This provides a coarse adjustment for height of the central post with a fine adjustment being provided by the adjustable mounting for a post foot 33 comprising a threaded member 34 threaded in the lower end of the post. The foot 33 carries a tacky material on the underside thereof for securely engaging the floor 11. The upper end of the post 15 is secured in position to the ceiling 10 by suction cups 35 and 36 carried on a bracket 37 having a U-shaped central part 38 fitted within a notched upper end of the inner member 31. The notches in the upper end of said member cause the bracket 37 to be locked against rotation in the post 15.

Each of the trolleys 17 and 18 are of the same construction, and one of these trolleys is shown in FIGS. 4, 5 and 6 and hereinafter described. The trolley has a generally V-shaped base 40a which at each end thereof carries an upwardly opening hook formed by a pair of legs 40 and 41 with the wire 14 passing between the legs and at the bottom of the hook. The trolley base 40a also carries a pair of pulleys 42 and 43 which support the trolley on the wire 14 while the hooks formed by the legs 40 and 41 confine the trolley to the wire 14 and prevent any bouncing action of the trolley from causing the pulleys 42 and 43 to leave the wire 14. The upper ends of the legs 40 and 41 are connected by wires 44 and 45 respectively, which provide a frame for advertising displays hung from the trolleys and as shown in broken line in FIG. 1 at 46 and 47.

It will be seen that the trolleys 17 and 18 are free to move along the wire 14 with the trolley 17 traveling between a point adjacent the wall 12 and the central post 15, and the trolley 18 traveling between the central post 15 and a point adjacent the wall 13. The trolleys 17 and 18 are caused to reciprocate back and forth by deflection of the wire 14 between the maximum limit positions B and C.

Means for causing the wire deflection comprises a motor 50 which through suitable speed reducing gearing (not shown) drives a sprocket shaft 51 having a sprocket 51a and about which a chain 52 travels. The chain 52 also passes about an idler sprocket 53 spaced a distance from the sprocket shaft 51. These parts are mounted on a bracket 54 having a flange 55 provided with suitable openings 56 for attachment to the central post 15, as shown in FIGS. 2 and 3. This bracket also has an opening 57 through which the sprocket shaft 51 extends and an opening 58 through which the shaft for idler sprocket 53 extends. This bracket also mounts the motor 50. A pair of vertically spaced ears 59 and 60 on the bracket 54 mount a rod 61 on which a collar 62 is slidably mounted with this collar carrying an eye 63 through which the wire 14 passes. A connecting link 64 connects the collar 62 to the chain 52 whereby the collar 62 is caused to repeatedly travel up and down and cause the alternate deflection of the wire member to positions at opposite sides of the central nondeflected position A. The bracket 54, as shown in FIGS. 1 and 2, has a pair of arms 70 and 71 connected thereto which support an advertising display, shown in broken line at 72, which blocks the wire deflecting mechanism from view and also provides a central display point to which a person's eye is directed by the travel of the trolleys 17 and 18 toward the central display 72.

An alternate embodiment of means for deflecting the wire 14 is shown in FIG. 8 with structure corresponding to that shown in FIGS. 1–7 having the same reference numeral. The bracket 80 mounts a motor 81 having a speed reducing gearing (not shown) which drives a shaft 82 having an arm 83 fixed thereon with the arm having a pair of wire engaging members 84 and 85 at the end thereof which capture the wire member, whereby rotation of the arm 83 causes the wire to deflect between the maximum positions of deflection. The bracket 80 carries suitable rod structure having ends 86 and 87 for support of an advertising display. Two positions of the arm 83 are shown in full line and broken line respectively in FIG. 8.

It will be seen from the foregoing structure that an eye-catching advertising display device is provided. The display is mobile and locatable at a height to be clearly visible. In one embodiment the wire 14 has a length of approximately 100 feet and the central support post 15 is located midway between the ends of the wire members. The sprockets 51a and 53 of the wire deflecting means in the embodiment of FIGS. 1–7 are spaced apart a desired distance to obtain the desired total wire deflection, and the motor 51 is operated at a speed to cause a gradual change in the slope of the wire 14 to thus induce a slow steady travel of the trolleys 17 and 18 outwardly from the central post toward the side walls and then upon a change in slope of the wire 14, to cause the trolleys 17 and 18 to travel toward each other and the central post 15. The spring 20 maintains the wire 14 at an even tension during the raising and lowering of the wire member and thus contracts as the total wire length becomes less at the central nondeflected position A.

I claim:

1. A traveling display device comprising an elongated member extendable between spaced wall supports, means intermediate the ends of the member for deflecting the member centrally thereof alternately to positions either side of a central undeflected position to slope the member in alternate directions, a pair of display trolleys mounted on said member one at each side of said means for free movement to travel in a direction induced by the slope of the member, each of said trolleys having a frame for supporting an advertising display, a floor-to-ceiling support for said means, and a frame on said support for supporting an advertising display.

2. An advertising display device suitable for use in a building such as a store comprising, a wire extending between and attached to a pair of spaced supports with a spring connected to the wire to maintain tension therein, a post extendable between spaced supports such as a floor and ceiling and adjustable in height to the space therebetween, said post being positioned approximately midway between the ends of said wire, means on said post and engageable with the wire at a point generally midway between the ends thereof for deflecting said point to alternate positions both above and below a central nondeflected position including a member engageable with the wire, and means for moving said member to limit positions spaced lengthwise of the post to carry said wire point to said alternate deflected positions, and a pair of trolleys mounted on said wire for free movement and one at each side of said post, said trolleys having wire engaging pulleys and a frame for holding advertising displays whereby the trolleys travel back and forth as the slope of the wire changes due to the wire deflection.

3. An advertising display device as defined in claim 2 in which said member moving means includes a motor, means mounting the motor on the post, a sprocket driven by the motor, an endless chain traveling lengthwise of the post and passing about the sprocket and an idler sprocket, said sprockets being spaced apart a distance substantially equal to the total wire deflection and equally spaced from said central wire position, said wire engaging member being connectable to said chain.

4. An advertising display device as defined in claim 2 in which said member moving means includes a motor mounted on the post with a drive shaft in alignment with said central position of the wire, a rotatable arm driven by the motor, and a wire engaging member carried on said arm.

5. An advertising display device as defined in claim 2 in which the trolley frame has a pair of legs with one of the pulleys mounted on each leg to rest upon the wire, an upwardly opening hook on each leg with the hook base immediately beneath the level of the pulley to hold the pulley and wire together as a unit, and display supports on said frame.

6. A moving advertising display device suitable for use in a building such as a store comprising, a wire extending between and attached to a pair of spaced supports, a post extendable between spaced supports such as a floor and ceiling and adjustable in height to the space therebetween, said post being positioned approximately midway between the ends of said wire, means on said post and engageable with the wire at a point generally midway between the ends thereof for deflecting said point to alternate positions both above and below a central nondeflected position, a pair of trolleys mounted on said wire for free movement and one at each side of said post and having a frame for holding advertising displays whereby the trolleys travel back and forth as the slope of the wire changes due to the wire deflection.

7. A display device as defined in claim 6 in which said deflecting means includes a motor, means mounting the motor on the post, a reciprocable member driven by the motor and connected to the wire, said member having a path equal in length to the total wire deflection, and means on the post for supporting an advertising display to hide said deflecting means.

8. An advertising display device comprising a deflectable wire-like member extendable between spaced supports, means for deflecting an intermediate part of the member alternately to positions either side of a central undeflected position to alternately change the slope of the member, a display trolley mounted on said member for free movement to travel in a direction induced by the slope of the member, and a support for said means.

References Cited in the file of this patent

UNITED STATES PATENTS

| | | |
|---|---|---|
| 1,441,261 | Ackman | Jan. 9, 1923 |
| 2,211,876 | Barnard | Aug. 20, 1940 |
| 2,249,803 | Wooten | July 22, 1941 |
| 2,787,088 | Gridley | Apr. 2, 1957 |